(12) United States Patent
Rogers

(10) Patent No.: US 7,578,860 B2
(45) Date of Patent: *Aug. 25, 2009

(54) CELLULAR COAL PRODUCTS AND PROCESSES

(75) Inventor: Darren Kenneth Rogers, Wheeling, WV (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 325 days.

This patent is subject to a terminal disclaimer.

(21) Appl. No.: 10/810,899

(22) Filed: Mar. 29, 2004

(65) Prior Publication Data

US 2004/0180187 A1    Sep. 16, 2004

Related U.S. Application Data

(63) Continuation of application No. 10/046,436, filed on Jan. 14, 2002, now Pat. No. 6,814,765, which is a continuation-in-part of application No. 09/453,729, filed on Dec. 2, 1999, now abandoned.

(51) Int. Cl.
   *C10L 5/00* (2006.01)
(52) U.S. Cl. .................... 44/620; 156/78; 264/29.1; 264/29.6; 423/448
(58) Field of Classification Search .................. 44/607, 44/620; 156/78; 264/29.1, 29.6; 423/448
   See application file for complete search history.

(56) References Cited

U.S. PATENT DOCUMENTS

| | | | |
|---|---|---|---|
| 3,309,437 A | 3/1967 | Harnett | 423/460 |
| 4,127,391 A | 11/1978 | Koppelman | 44/282 |
| 6,656,239 B1 * | 12/2003 | Rogers et al. | 44/620 |
| 6,749,652 B1 * | 6/2004 | Rogers | 44/607 |

FOREIGN PATENT DOCUMENTS

| GB | 14899690 | 10/1977 |
|---|---|---|
| JP | 08112876 A | 5/1996 |

OTHER PUBLICATIONS

ULTRAFOAMc Open-cell carbon foam; http://www.ultramet.com/8.htm.*

* cited by examiner

*Primary Examiner*—Cephia D Toomer
(74) *Attorney, Agent, or Firm*—Philip D. Lane

(57) ABSTRACT

According to the present invention there is provided a coal-based carbon foam having a density of between about 0.1 g/cm$^3$ and about 0.8 g/cm$^3$, preferably between about 0.2 g/cm$^3$ and about 0.6 g/cm$^3$ and most preferably between about 0.3 g/cm$^3$ and about 0.4 g/cm$^3$ that is produced by the controlled heating of high volatile bituminous coal particulate in a "mold" and under a non-oxidizing atmosphere. The high volatile bituminous coal starting material preferably exhibits a free swell Index of between about 3.5 and about 5.0 and most preferably between about 3.75 and about 4.5. A number of additional highly desirable characteristics of the high volatile bituminous coal starting material are also described. The carbon foam product thereby produced can be machined, adhered and otherwise fabricated to produce a wide variety of low cost, low density products, or used in its preformed shape as a filter, beat or electrical insulator etc. Such carbon foams, without further treatment exhibit compressive strengths of up to about 6000 psi. Further treatment by carbonization or graphitization yields products that can be used as electrical or heat conductors. Methods for the production of these coal-based cellular products are also described.

1 Claim, 2 Drawing Sheets

CELLULAR COAL PRODUCTS AND PROCESSES

This application is a continuation of U.S. patent application Ser. No. 10/046,436 filed Jan. 14, 2002, now U.S. Pat. No. 6,814,765, which is a continuation-in-part of U.S. patent application Ser. No. 09/453,729 filed Dec. 2, 1999, now abandoned.

FIELD OF THE INVENTION

The present invention relates to cellular coal products produced from coal powder and to their methods of production. Products utilizing the coal-based porous products are also described.

BACKGROUND OF THE INVENTION

ASTM standards DD5515-97, "Standard Test Method for the Determination of Swelling Properties of Bituminous Coal" and D720-91 "Standard Test Method for Free Swelling Index of Coal" both define conditions for measuring the inherent property of coals to "swell" upon heating in an uncontrolled combustion situation. Hence, the propensity of coal to swell is well known in the prior art. To the best of our knowledge, however, no one has attempted to take advantage of this property of coals to swell by controllably "swelling" a coal product to obtain a highly useful, low density, porous carbon product.

Similarly, very sophisticated processes have been developed for the production of cellular foamed carbon products. Such processes often involve the use of blowing agents and the application of very high pressures in the fabrication process, and many use highly sophisticated starting materials. These materials, while very lightweight and demonstrating superior strength, tend to be relatively costly, either due to the nature of their starting materials and/or the complexity of their fabrication processes.

There exists a wide and varied class of requirements for low-density materials in the construction, aerospace, transportation, metal processing and other industries for which low-density materials are constantly being developed. Many of these materials exhibit properties such as fire resistance that make them uniquely suited to their end use application. In many applications, however, the aforementioned relatively high cost, low-density materials cannot be used because the final application will simply not justify their relatively high cost.

Accordingly, it would be most desirable if a relatively low cost, low-density material demonstrating many of the desirable characteristics of the aforementioned products, such as fire resistance, were available

OBJECTS OF THE INVENTION

It is therefore an object of the present invention to provide a relatively low cost, low density product that is suited to application in the construction, aerospace, transportation, metal processing and other industries where such properties are desired.

It is another object of the present invention to provide a simple and low cost method for the production of such products.

SUMMARY OF THE INVENTION

According to the present invention there are provided coal-based cellular or porous products, also referred to herein as "carbon foams", having a density of preferably between about 0.1 $g/cm^3$ and about 0.8 $g/cm^3$ and most preferably between about 0.3 and about 0.4 $g/cm^3$ that are produced by the controlled heating of coal particulate preferably up to % inch in diameter in a "mold" and under a non-oxidizing atmosphere. According to a specifically preferred embodiment, the starting material coal has a free swell index as determined by aforementioned ASTM D720 test of between about 3.5 and about 5.0. According to further preferred embodiments of the present invention, the starting material coal exhibits one or more and preferably all of the following set of properties: 1) a volatile matter content (dry, ash-free basis) of between about 35 and about 35% as defined by ASTM D3175, "Test Method for Volatile Matter in the Analysis of Coal and Coke"; 2) a fixed carbon (dry basis) between about 50 and about 60% as defined by ASTM D3172, "Practice for Proximate Analysis of Coal and Coke"; 3) a Gieseler initial softening temperature of between about 380° C. and about 400° C. as determined by ASTM D2639, Test Method for Plastic Properties of Coal by the Constant-Torque Gieseler Plastometer"; 4) a plastic temperature range above about 50° C. as determined by ASTM D2639; 5) a maximum fluidity of at least 300 ddpm (dial divisions per minute) and preferably greater than about 2000 ddpm as determined by ASTM D2639; 6) expansion greater than about 20% and preferably greater than about 100% as determined by Arnu Dilatation; 7) vitrinite reflectance in the range of from about 0.80 to about 0.95 as determined by ASTM D2798, "Test Method for Microscopical Determination of the Reflectance of Vitrinite in Polished Specimens of Coal"; 8) less than about 30% inert maceral material such as semifusinite, micrinit, fusinite, and mineral matter as determined by ASTM D2798; and 9) no significant oxidation of the coal (0.0 vol % moderate or severe oxidation) as determined by ASTM D 2798 and non-maceral analysis. (The desirability of each of these individual properties and their order of preference will be further elaborated below.) The porous product or carbon foams thus produced, preferably as a net shape or near net shape, can be machined, adhered and otherwise fabricated to produce a wide variety of low cost, low density products, or used in its preformed shape as a filter, heat or electrical insulator etc. Such cellular products, without further treatment and/or the addition of strengthening additives have been shown to exhibit compressive strengths of up to about 4000 psi at densities of between about 0.3 and about 0.4 $g/cm^3$ or 19 to 15 $lb/ft^3$. Other interesting properties of such materials are tensile strengths of between about 300 and 1000 psi, shear strengths in the range of about 300 psi and Impact resistances of between about 0.3 and 0.4 ft-lbs./$in^2$ as measured by Izod impact on a notched, 0.5 square inch cross-section sample. Impregnation with appropriate materials or the incorporation of various strength improving additives can further increase the compressive, tensile and other properties of these cellular materials. Further treatment by carbonization or graphitization yields cellular products that can be used as electrical or heat conductors.

DETAILED DESCRIPTION

Figure 1:
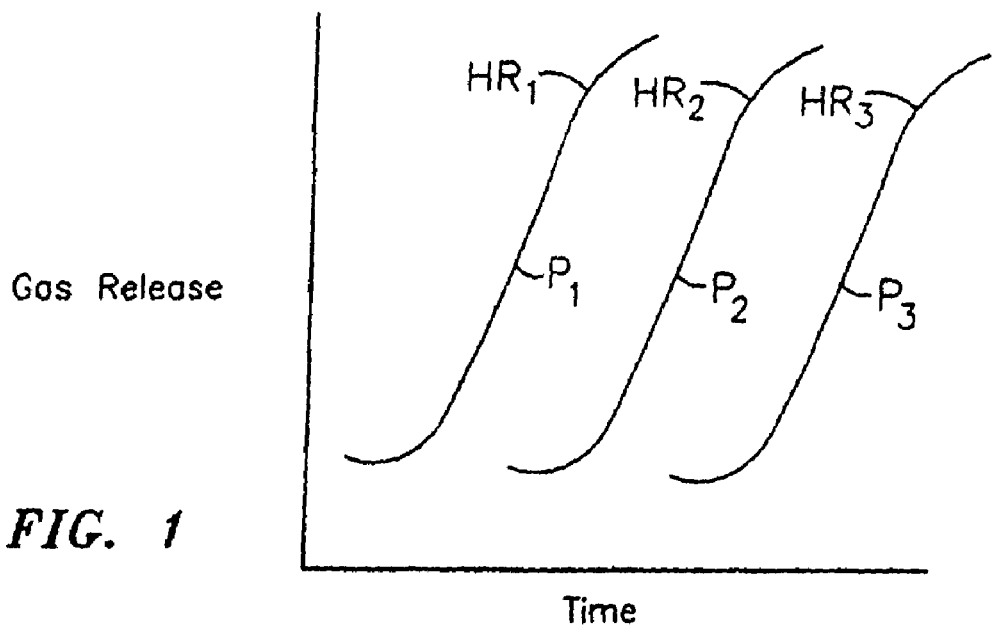
FIG. 1 is a graph of showing the general relationship between gas evolution and time/temperature at various operating pressures and temperatures for the process of the present invention.

According to the present invention, a preformed, low density, i.e., from about 0.1 to about 0.8 g/cm$^3$, preferably from about 0.2 to about 0.6 g/cm$^3$ and most preferably from about 0.3 to about 0.4 g/cm$^3$, cellular product, carbon foam, is produced from powdered coal particulate preferably less than about ¼ inch in diameter by the controlled heating of the powdered coal in a "mold" under a non-oxidizing atmosphere. The starting material coal may include bitumen, anthracite, or even lignite, or blends of these coals that exhibit a "free swell index" as determined by ASTM D720 of between about 3.5 and about 5.0, but are preferably bituminous, agglomerating coals that have been comminuted to an appropriate particle size, preferably to a fine powder below about −60 to −80 mesh. Additionally, according to further highly preferred embodiments of the present invention the coal starting materials of the present invention possess all or at least some of the following characteristics: 1) a volatile matter content (dry, ash-free basis) of between about 35 and about 35% as defined by ASTM D3175, "Test Method for Volatile Matter in the Analysis of Coal and Coke"; 2) a fixed carbon (dry basis) between about 50 and about 60% as defined by ASTM D3172, "Practice for Proximate Analysis of Coal and Coke"; 3) a Gieseler initial softening temperature of between about 380° C. and about 400° C. as determined by ASTM D2639, Test Method for Plastic Properties of Coal by the Constant-Torque Gieseler Plastometer"; 4) a plastic temperature range above about 50° C. as determined by ASTM D2639; 5) a maximum fluidity of at least 300 ddpm (dial divisions per minute) and preferably greater than about 2000 ddpm as determined by ASTM D2639; 6) expansion greater than about 20% and preferably greater than about 100% as determined by Arnu Dilatation; 7) vitrinite reflectance in the range of from about 0.80 to about 0.95 as determined by ASTM D2798, "Test Method for Microscopical Determination of the Reflectance of Vitrinite in Polished Specimens of Coal"; 8) less than about 30% inert maceral material such as semifusinite, micrinit, fusinite, and mineral matter as determined by ASTM D2798; and 9) no significant oxidation of the coal (0.0 vol % moderate or severe oxidation) as determined by ASTM D 2798 and non-maceral analysis. The low softening point (380-400° C.) is important so that the material softens and is plastic before volatalization and coking occur. The large plastic working range or "plastic range" is important in that it allows the coal to flow plastically while losing mass due to volatalization and coking. Vitrinite reflectance, fixed carbon content and volatile matter content are important in classifying these coal starting materials as "high-volatile" bituminous coals that provide optimum results in the process of the present invention and thus, carbon foam materials that exhibit an optimum combination of properties when prepared in accordance with the process described and claimed herein. The presence of oxidation tends to hinder fluidity and consequently, foam formation.

Thus according to various preferred embodiments of the present invention, a coal particulate starting material characterized as a high-volatile bituminous coal containing from about 35% to about 45% by weight (dry, ash-free basis) volatile matter, as defined by ASTM D3175, is a basic requirement for obtaining optimum results in the form of optimum carbon foaming in accordance with the process of the present invention. The various parameters derived from the Gieseler plasticity evaluations form the second highly important set of characteristics of the starting material coal if optimum results are to be obtained. Thus, a softening point in the range of from about 380° C. and about 400° C., a plastic range of at least about 50° C. and preferably between about 75 and 100° C., and a maximum fluidity of at least several hundred and preferably greater than 2000 ddpm(dial divisions per minute) are highly important to the successful optimized practice of the present invention. Accordingly, in order to obtain the carbon foams exhibiting the superior properties described herein, it is important that the coal starting material be a high volatile bituminous coal having a softening point as just described and a plastic range on the order of above about 50° C. all with the indicated Gieseler fluidity values described. Exhibition of Arnu dilatation values greater than about 20% and preferably above about 100% when combined with the foregoing characteristics provide indications of a highly preferred high volatile bituminous coal starting material.

The cellular coal-based products described herein are semi-crystalline or more accurately turbostratically-ordered and largely isotropic i.e., demonstrating physical properties that are approximately equal in all directions. The cellular coal-based products of the present Invention typically exhibit pore sizes on the order of less than 300μ, although pore sizes of up to 500μ are possible within the operating parameters of the process described. The thermal conductivities of the cellular coal-based products are generally less than about 1.0 W/m/° K. Typically, the cellular coal-based products of the present invention demonstrate compressive strengths on the order of from about 2000 to about 6000 psi at densities of from about 0.4 to about 0.5 g/cm$^3$. It is critical to the successful practice of the present invention that the coal starting material exhibit the previously specified free swell index of between about 3.5 and about 5.0 and preferably between about 3.75 and about 4.5. Selection of starting materials within these parameters was determined by evaluating a large number of coals characterized as ranging from high to low volatiles. In general, it has been found that bituminous coals exhibiting free swell indexes within the previously specified ranges provided the best foam products in the form of the lowest calcined foam densities and the highest calcined foam specific strengths (compressive strength/density). Such bituminous coals that also possess the foregoing set of properties, high volatile content (35% to 45% by weight), large plastic range (at least about 50° C.), etc. and are thus characterized as high volatile bituminous coals, form the preferred starting materials of the process of the present invention. Coals having free swell indices below the specified preferred ranges may not agglomerate properly leaving a powder mass or sinter, but not swell or foam, while coals exhibiting free swell indices above these preferred ranges may heave upon foaming and collapsed upon themselves leaving a dense compact.

The production method of the present invention comprises: 1) heating a high volatile bituminous coal particulate of preferably small i.e., less than about ¼ inch particle size in a "mold" and under a non-oxidizing atmosphere at a heat up rate of from about 1 to about 20° C. to a temperature of between about 300 and about 700° C.; 2) soaking at a temperature of between about 300 and about 700° C. for from about 10 minutes up to about 12 hours to form a preform or finished product; and 3) controllably cooling the preform or finished product to a temperature below about 100° C. The non-oxidizing atmosphere may be provided by the introduction of inert or non-oxidizing gas into the "mold" at a pressure of from about 0 psi, i.e., free flowing gas, up to about 500 psi. The inert gas used may be any of the commonly used inert or non-oxidizing gases such as nitrogen, helium, argon, $CO_2$, etc.

It is generally not desirable that the reaction chamber be vented or leak during the heating and soaking operation. The pressure of the chamber and the increasing volatile content therein tends to retard further volatilization while the cellular product sinters at the indicated elevated temperatures. If the furnace is vented or leaks during soaking, an insufficient amount of volatile matter may be present to permit interparticle sintering of the coal particles thus resulting in the formation of a sintered powder as opposed to the desired cellular product. Thus, according to a preferred embodiment of the present process, venting or leakage of non-oxidizing gas and generated volatiles is inhibited consistent with the production of an acceptable cellular product.

Additional more conventional blowing agents may be added to the particulate prior to expansion to enhance or otherwise modify the pore-forming operation.

The term "mold", as used herein is meant to define a mechanism for providing controlled dimensional forming of the expanding coal. Thus, any chamber into which the coal particulate is deposited prior to or during heating and which, upon the coal powder attaining the appropriate expansion temperature, contains and shapes the expanding porous coal to some predetermined configuration such as: a flat sheet; a curved sheet; a shaped object; a building block; a rod; tube or any other desired solid shape can be considered a "mold" for purposes of the instant invention.

As will be apparent to the skilled artisan familiar with pressurized gas release reactions, as the pressure in the reaction vessel, in this case the mold increases, from 0 psi to 500 psi, as imposed by the non-oxidizing gas, the reaction time will increase and the density of the produced porous coal will increase as the size of the "bubbles" or pores produced in the expanded coal decreases. Similarly, a low soak temperature at, for example about 400° C. will result in a larger pore or bubble size and consequently a less dense expanded coal than would be achieved with a soak temperature of about 600° C. Further, the heat-up rate will also affect pore size, a faster heat-up rate resulting in a smaller pore size and consequently a denser expanded coal product than a slow heat-up rate. These phenomenon are, of course, due to the kinetics of the volatile release reactions which are affected, as just described, by the ambient pressure and temperature and the rate at which that temperature is achieved. These process variables can be used to custom produce the expanded coals of the present invention in a wide variety of controlled densities, strengths etc. These results are graphically represented in the Figure where the X axis is gas release, the Y axis is time and the individual curves represent different pressures of inert gas $P_1$, $P_2$, and $P_3$, different heat-up rates $HR_1$, $HR_2$, and $HR_3$, and $P_1 < P_2 < P_3$ and $HR_1 < HR_2 < HR_3$.

Cooling of the preform or product after soaking is not particularly critical except as it may result in cracking of the preform or product as the result of the development of undesirable thermal stresses. Cooling rates less than 10° C./min to a temperature of about 100° C. are typically used to prevent cracking due to thermal shock. Somewhat higher, but carefully controlled, cooling rates may however, be used to obtain a "sealed skin" on the open cell structure of the product as described below. The rate of cooling below 100° C. is in no way critical.

After expanding the high volatile bituminous coal particulate as just described, the porous or foamed coal product is an open celled material Several techniques have been developed for "sealing" the surface of the open celled structure to improve its adhesive capabilities for further fabrication and assembly of a number of parts. For example, a layer of a commercially available graphitic adhesive can be coated onto the surface and cured at elevated temperature or allowed to cure at room temperature to provide an adherent skin. Alternatively, the expansion operation can be modified by cooling the expanded coal product or preform rapidly, e.g., at a rate of 10° C./min or faster after expansion. It has been discovered that this process modification results in the formation of a more dense skin on the preform or product which presents a closed pore surface to the outside of the preform or product. At these cooling rates, care must be exercised to avoid cracking of the preform or product.

After expanding, the porous coal-based preform or product, i.e. carbon foam in accordance with the present invention, is readily machineable, sawable and otherwise readily fabricated using conventional fabrication techniques.

Subsequent to production of the preform or product as just described, the preform or product may be subjected to carbonization and/or graphitization according to conventional processes to obtain particular properties desirable for specific applications of the type described hereinafter. Ozonation may also be performed, if activation of the coal-based expanded product would be useful in a final product application such as in filtering of air. Additionally, a variety of additives and structural reinforcers may be added to the coal based preforms or products either before or after expansion to enhance specific mechanical properties such as fracture strain, fracture toughness and impact resistance. For example, particles, whiskers, fibers, plates, etc. of appropriate carbonaceous or ceramic composition can be incorporated into the porous coal-based preform or product to enhance its mechanical properties.

The open celled, coal-based preforms or products, i.e. carbon foams, of the present invention can additionally be impregnated with, for example, petroleum pitch, epoxy resins or other polymers using a vacuum assisted resin transfer type of process. The incorporation of such additives provides load transfer advantages similar to those demonstrated in carbon composite materials. In effect a 3-D composite is produced that demonstrates enhanced impact resistance and load transfer properties.

The cooling step in the expansion process results in some relatively minimal shrinkage on the order of less than about 5% and generally in the range of from about 2% to about 3%. This shrinkage must be accounted for in the production of near net shape preforms or final products of specific dimensions and is readily determinable through trial and error with the particular coal starting material being used. The shrinkage may be further minimized by the addition of some inert solid material such as coke particles, ceramic particles, ground waste from the coal expansion process etc. as is common practice in ceramic fabrication.

Carbonization, sometimes referred to as calcining, is conventionally performed by heating the preform or product under an appropriate inert gas at a heat-up rate of less than about 5° C. per minute to a temperature of between about 800° C. and about 1200° C. and soaking for from about 1 hour to about three or more hour Appropriate inert gases are those described above that are tolerant of these high temperatures. The inert atmosphere is supplied at a pressure of from about 0 psi up to a few atmospheres. The carbonization/calcination process serves to remove all of the non-carbon elements present in the preform or product such as sulfur, oxygen, hydrogen, etc.

Graphitization, commonly involves heating the preform or product either before or after carbonization at heat-up rate of less than about 10° C. per minute, preferably from about 1° C. to about 5° C. per minute, to a temperature of between about 1700° C. and about 3000° C. in an atmosphere of helium or argon and soaking for a period of less than about one hour. Again, the inert gas may be supplied at a pressure ranging from about 0 psi up to a few atmospheres.

The porous coal-based preforms or products resulting from processing in accordance with the foregoing procedures can be used in a broad variety of product applications, some, but not all, of which will now be broadly described.

Perhaps the simplest products that could be fabricated using the coal-based porous preforms or products of the present invention are various lightweight sheet products useful in the construction industry. Such products may involve the lamination of various facing materials to the surface of a planar sheet of the preform material using an appropriate adhesive. For example, a very light and relatively inexpensive wall board would simply have paper laminated to its opposing planar surfaces, while a more sophisticated curtain wall product might have aluminum sheet, polymer or fiber-reinforced polymer sheets or even stainless steel sheet laminated thereto. A wide variety of such products that have lightweight, low cost and adequate strength can easily be envisioned for wallboard, structural wallboard, bulkheads, etc. The materials of the present invention exhibit sound insulation and vibration resistance due to excellent sound and vibration damping properties, good thermal insulating properties (less than about 1 watt per meter K thermal conductivity).

Laminates of these materials may even be used to produce heating element incorporating members, since a graphitized core could serve as an electrical heating element when connected to an appropriate source of electrical energy.

Similar surface laminated porous preform core based products could also find use in the transportation industry where lighter and, especially fire retardant walls, bulkheads, containers, etc. are in constant demand. Such products would of course require that the expanded coal-based porous core be carbonized as described hereinabove prior to application of the exterior skins, if fire resistance or retardancy is desired.

Yet another product application for the porous coal products or carbon foams of the present invention is as a replacement for the ceramic foam filters currently applied in the filtering of molten metal such as aluminum for the removal of contaminating particulates also called inclusions. The current ceramic foam materials are relatively expensive and extremely friable. It is easily possible to produce a porous coal-based preform of the type described herein having an appropriate pore size and of the same size and shape as the ceramic foam filter using the above described fabrication process, to serve as a molten metal filter of this type. The cost of such a more robust, i.e., less friable, filter would be considerably less than that of a comparable ceramic foam filter.

Yet other product applications for the carbon foam materials of the present invention reside in the field of heat exchangers. In this application, the heat transfer properties of a graphitized porous coal-based material can be exploited to produce a heat exchanger capable of extracting heat from or adding heat to a fluid (gas or liquid) flowing through porous coal pores. In this case, the coal-based porous product is joined to an appropriate heat transfer mechanism such as an aluminum skin.

As already alluded to, the coal-based porous preforms and products of the present invention can be produced in any solid geometric shape. Such production is possible using any number of modified conventional processing techniques such as extrusion, injection molding, etc. In each of such instances, the process must, of course, be modified to accommodate the processing characteristics of the starting material coal. For example, in extruding such products, as described below, the coal powder starting material is fed by an auger into an expansion chamber where it is expanded and from which it is extruded while still viscous. Upon exiting the extrusion die, the material is cooled to provide a solid shape of the desired and precalculated dimensions. To improve the efficiency, i.e., cycle time of the process, the input material can be preheated to a temperature below the expansion point, e.g., below about 300° C., fed into the auger chamber where additional heat is imparted to the powder with final heating being achieved just before extrusion through the die.

Similar relatively minor process modifications can be envisioned to fabricate the carbon foams of the present invention in injection molding, casting and other similar conventional material fabrication processes.

The following examples will serve to illustrate the practice of the invention.

EXAMPLES

Example 1

Figure 2:
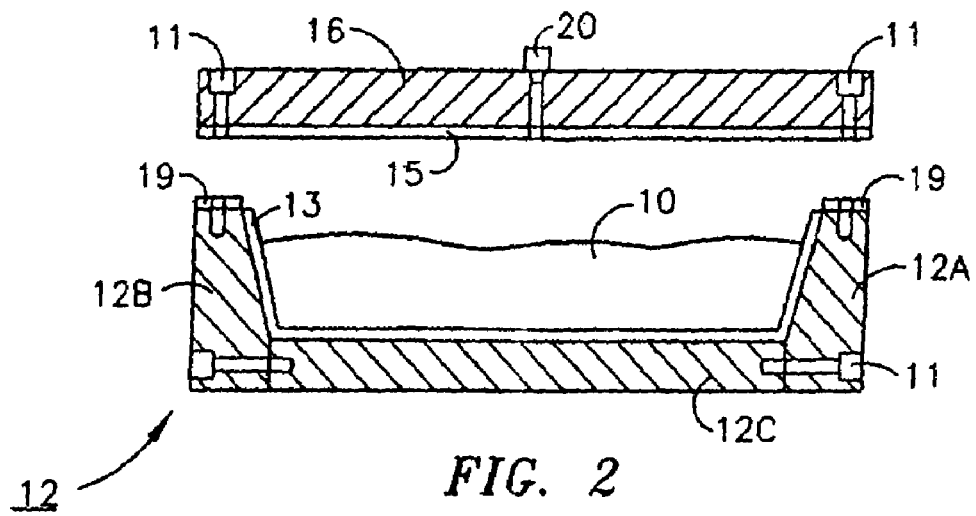
FIG. 2 is a cross-sectional view of a "mold" containing powdered coal prior to expansion in accordance with the process of the present invention.
Figure 3:
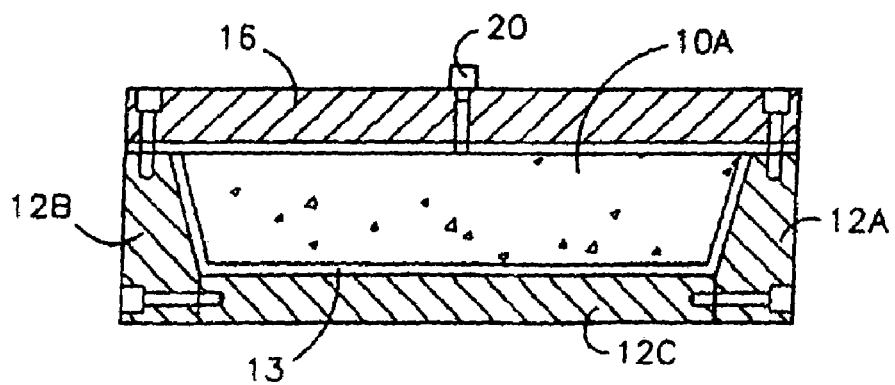
FIG. 3 is a cross-sectional view of the "mold" of FIG. 2 subsequent to expansion of the powdered coal in accordance with the process of the present invention.

As shown in FIG. 2, a layer 10 of comminuted bituminous coal having a free swell index of about 4 and ground to a particle size of about −60 mesh and about 2 inch deep is deposited in mold 12 equipped with a cover 16. Mold 12 is assembled from three individual pieces carbon or tool steel pieces, sides 12A and 12B and bottom 12C, all joined together by bolts 11 and lined with a ceramic glaze or spray applied ceramic lining 13. Cover 16 includes a similar interior ceramic lining 15 and is attached to sides 12A and 12B with bolts 17 in the final assembly prior to heating. Gaskets 19 are preferably used to insure a tight fit of cover 16 onto sides 12A and 12B. Cover 16 is optionally equipped with a sintered vent plug 20 to permit purging of the Interior of mold 12 with non-oxidizing gas. This configuration, incorporating valve 20 also permits pressurization, if desired to control expansion speed and/or pore size in the final product as described hereinabove. Nitrogen gas is repeatedly introduced through valve 20 to assure that all oxygen in mold 12 is purged (generally 2-4 such purges have been found satisfactory) and to provide a one atmosphere pressure of nitrogen inside of mold 12. Mold 12 is then heated at a rate of from about 1 to about 10° C./min up to a temperature of about between about 450 and 600° C. and held at this temperature sufficient to devolatalize and sinter the cellular product (generally less than about one hour). This treatment results in the production of an open celled expanded coal product 10A as shown in FIG. 3. Mold 12 is then cooled to room temperature at a rate of less than about 10° C./min. to a temperature of 100° C.; any remaining pressure is then vented through valve 15 and the sample removed from mold 12 by disassembly of mold 12 by disengagement of bolts 11. Expanded coal product 10A is thereby readily removed from mold 14 and is subsequently sawed to the desired dimensions.

Product 10A has a density of between about 0.4 and about 0.6 g/cm$^3$ and demonstrates a compressive strength on the order of between about 2000 and 6000 psi. Thermal conductivity as determined by the guarded heat flow method is below about 1.0 W/m/K.

Example 2

Figure 4:
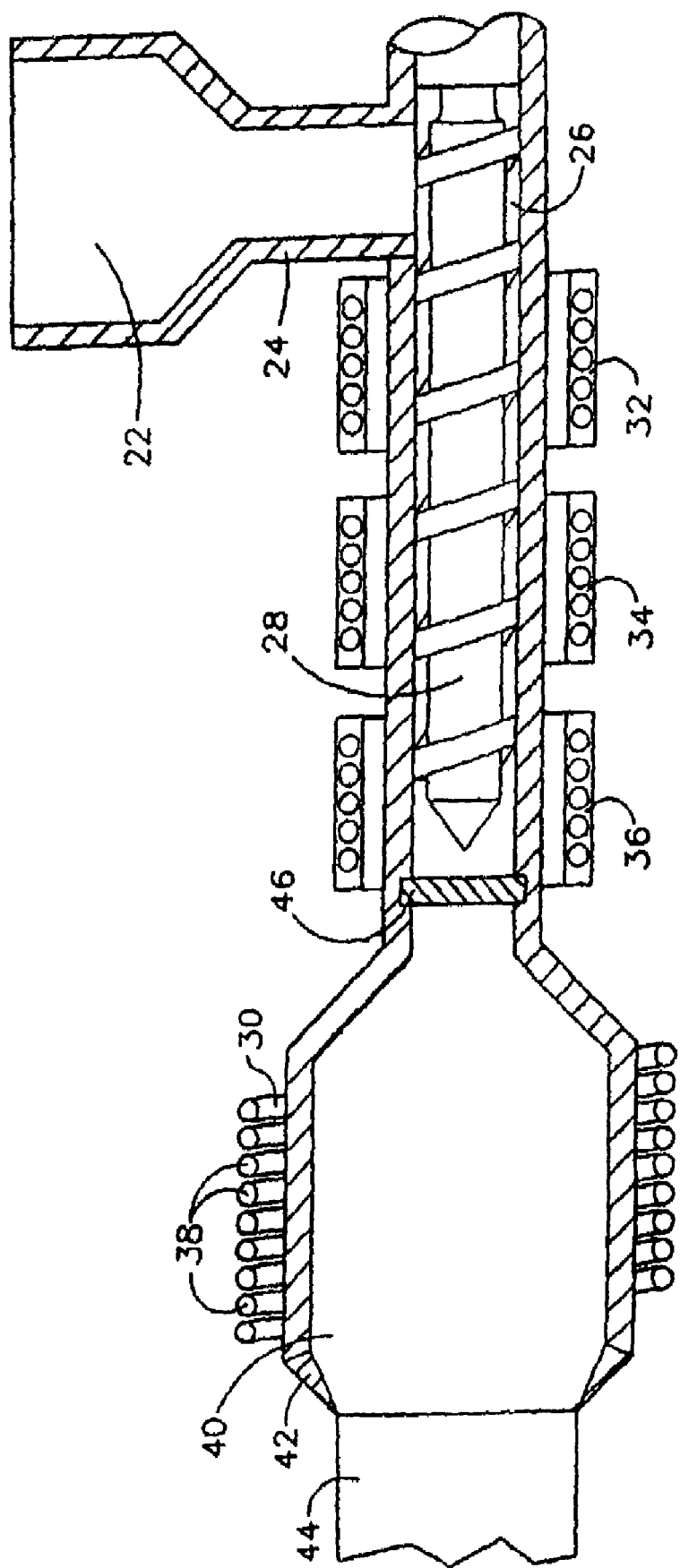
FIG. 4 is a cross-sectional diagram of an extruder suitable for the production of coal-based porous products in accordance with the present invention.

The application of the process of the present invention in an extrusion process is depicted in FIG. 4. As shown in that figure, comminuted bituminous coal 22 of a particle size of about −80 mesh is introduced via hopper 24 into chamber 26 equipped with auger 28 that moves particulate coal 18 through chamber 26 and into expansion chamber 30. Chamber 26 is heated by means of a series of barrel heaters 32, 34 and 36 to impart a temperature of less than about 300° C. to particulate coal 18 as it approaches and enters expansion chamber 26. As is conventional practice in extrusion, chamber 26 is divided into a feed section, a compression section and a metering section each defined roughly by the location of barrel heaters 32, 34 and 36 and imparted by the tapered shape of auger 28. Expansion chamber 30 is maintained under a non-oxidizing atmosphere and at a temperature of about 450° C. by means of barrel heater 38. Particulate coal 18 expands within chamber 26 to form expanded coal product 40 and, while still viscous, expanded coal product 40 is extruded through a die 42 to form solid shaped product 44 upon cooling to room temperature. Solid shaped product 44 demonstrates properties similar to those obtained from the product described in Example 1.

At the point where particulate coal 22 exits chamber 26 and enters expansion chamber 30, chamber 26 is preferably equipped with a breaker plate 46 that serves to break up any large agglomerates of particulate coal 22 that may have formed in transit within chamber 26.

Cellular coal-based extrudate 44 may have virtually any solid shape ranging from a large flat panel 4'×8' as might be used as the core of the above-described building panel to square shapes, rounds, channels and even tubular shapes if a bridge die is used in the extrusion process. Almost any shape that can be achieved with plastic or metal extrusion can be similarly obtained using the process of the present invention.

As the invention has been described, it will be apparent to those skilled in the art that the same may be varied in many ways without departing from the spirit and scope of the invention. Any and all such modifications are intended to be included within the scope of the appended claims.

What is claimed is:

1. A green carbon foam comprising a density ranging from about 0.1 g/cm$^3$ to about 0.8 g/cm$^3$ and a compressive strength below about 6000 psi manufactured by the process comprising:

heating high volatile bituminous coal particles exhibiting a free swell index ranging from about 3.5 to about 5.0 at a range in the range of about 1° C./minute to about 20° C./minute to a temperature ranging from about 300° C. to about 700° C. in a pressure controlled reactor, under a pressurized non-oxidizing atmosphere having a pressure from about that of free flowing gas to about 500 psi; and controllably cooling said green carbon foam at a cooling rate of less than about 10° C./minute to a temperature of about 100° C.

* * * * *